United States Patent
Bliven et al.

(10) Patent No.: US 8,670,232 B2
(45) Date of Patent: Mar. 11, 2014

(54) MODULAR FLAT-PANEL MONITOR STAND

(75) Inventors: Robert P. Bliven, Saratoga, CA (US); Jacques Gagne, Los Gatos, CA (US); Kenneth G. Robertson, San Jose, CA (US); Brian Lee, Cupertino, CA (US); Brian David Perry, Morgan Hill, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 265 days.

(21) Appl. No.: 13/386,428

(22) PCT Filed: Jul. 22, 2009

(86) PCT No.: PCT/US2009/051422
§ 371 (c)(1),
(2), (4) Date: Jan. 23, 2012

(87) PCT Pub. No.: WO2011/011001
PCT Pub. Date: Jan. 27, 2011

(65) Prior Publication Data
US 2012/0120628 A1    May 17, 2012

(51) Int. Cl.
*G06F 1/16* (2006.01)
*A47B 81/00* (2006.01)

(52) U.S. Cl.
USPC ............ 361/679.55; 361/679.21; 361/679.22; 361/679.56; 248/917; 248/919; 312/223.1; 312/223.2

(58) Field of Classification Search
USPC ............ 361/679.01–679.45, 679.55–679.59; 248/917–924; 312/223.1, 223.2
See application file for complete search history.

(56) References Cited

U.S. PATENT DOCUMENTS

| | | | |
|---|---|---|---|
| 5,582,373 A | 12/1996 | Baudot | |
| 5,733,025 A | 3/1998 | Jesse | |
| 5,868,079 A | 2/1999 | Charny | |
| 5,947,440 A | 9/1999 | Cho | |
| 5,978,211 A | 11/1999 | Hong | |
| 6,049,454 A | 4/2000 | Howell et al. | |
| 6,061,104 A | 5/2000 | Evanicky et al. | |
| 6,227,518 B1 | 5/2001 | Sun | |
| 6,231,021 B1 | 5/2001 | Hong | |
| 6,268,997 B1 | 7/2001 | Hong | |
| 6,330,993 B1 | 12/2001 | Cho | |
| 6,366,452 B1 | 4/2002 | Wang et al. | |
| 6,532,628 B2 * | 3/2003 | Kim ................................ | 16/342 |
| 6,570,627 B1 * | 5/2003 | Chang .......................... | 348/794 |

(Continued)

FOREIGN PATENT DOCUMENTS

| | | |
|---|---|---|
| CN | 2795926 | 7/2006 |
| CN | 201193760 Y | 2/2009 |
| KR | 1020060113207 | 11/2006 |

OTHER PUBLICATIONS

ISA/KR, International Search Report dated Mar. 25, 2010, PCT/US2009/051422 filed Jul. 22, 2009.

*Primary Examiner* — Jayprakash N Gandhi
*Assistant Examiner* — Nidhi Desai (57) ABSTRACT

A flat-panel display stand in accordance with the present invention includes a modular assembly for supporting a display on a horizontal surface so that the display tilt can be adjusted by the user. The stand has a modular design with only two modules: a retainer clip and supporting leg that are uniquely hinged together and connected to the rear of the display.

15 Claims, 9 Drawing Sheets

(56) References Cited

U.S. PATENT DOCUMENTS

| | | | |
|---|---|---|---|
| 7,636,133 B1 * | 12/2009 | Hsu | 348/794 |
| 7,922,133 B2 * | 4/2011 | Hsu | 248/127 |
| 7,937,810 B2 * | 5/2011 | Hu | 16/241 |
| 8,152,113 B2 * | 4/2012 | Chen et al. | 248/150 |
| 8,243,213 B2 * | 8/2012 | Chen et al. | 348/836 |
| 2003/0001053 A1 * | 1/2003 | Cho et al. | 248/122.1 |
| 2006/0049327 A1 * | 3/2006 | Chen | 248/371 |
| 2006/0221262 A1 * | 10/2006 | Ogawa et al. | 348/794 |
| 2006/0221263 A1 * | 10/2006 | Ogawa et al. | 348/794 |

* cited by examiner

MODULAR FLAT-PANEL MONITOR STAND

RELATED PATENT DATA

Cross-Reference to Related Application

This application claims priority to PCT Patent Application Serial No. PCT/US2009/051422, which was filed on Jul. 22, 2009 which is herein included by reference in its entirety for all purposes.

BACKGROUND OF THE INVENTION

The present invention relates generally to flat-panel monitors, and more particularly to an adjustable modular stand for supporting a flat-panel display, such as an LCD or a plasma-type display.

With the advent of compact LCD displays there have been a plethora of new designs adapted for mounting the displays vertically or for supporting the displays for free-standing upright use on a desktop or table. These mounting mechanisms range in design from elaborate support apparatus, such as the multi-position articulating bracket shown in U.S. Pat. No. 6,464,185, to very simple designs, such as the A-frame bracket shown in U.S. Pat. No. 7,251,125. Each would seem to have some advantage over the other whether in cost, size, appearance, or functionality. Some stands are free-standing while others are designed to be attached to the monitor itself and have their own base or other means of support. Those with telescopic support members or with articulating arms often provide continuous vertical adjustment to position the monitor at a particular height and tilt relative to the desktop or to the user. Still others provide rotational or swivel adjustment of the monitor screen for use in different multiple planes. All of these designs have different features to appeal to particular users. The more complex multi-functional designs are almost always more costly to fabricate than the simpler designs, even though the simpler designs often provide sufficient utility to many users.

For many purchasers of computer-type monitors, size, weight, cost, durability, and case-of-use are the primary factors in deciding on what type of monitor and support stand to purchase. Although style, appearance, and functionality often play a major part in selecting what type of monitor and stand a purchaser wants. Then for others, such as students or office workers, the physical "foot print" of the supporting stand and monitor is an important consideration along with its portability. Obviously there are many factors that go into the decision of what type or brand of monitor to purchase and it is also true that there is no single stand that fits everyone's needs.

Therefore, what is needed is a low cost, portable, compact, adjustable, modular stand for a flat-panel monitor that is easy to use while occupying a minimum amount of desk space and providing sufficient adjustment latitude for the majority of users.

While the following discussion and teachings focuses primarily on computer-type monitors, the invention has utility for other flat panel displays, such as electronic book readers (e-books/e-readers), digital picture displays, medical multi-function monitors, and other types of electronic display devices.

Further limitations and disadvantages of conventional and traditional approaches will become apparent to one skilled in the art, through comparison of such devices with a representative embodiment of the present invention as set forth in the remainder of the present application with reference to the drawings.

BRIEF DESCRIPTION OF THE DRAWINGS

For a better understanding of the invention as well as further features thereof, reference is made to the following description which is to be read in conjunction with the accompanying drawings wherein.

DETAILED DESCRIPTION

Figure 1A:
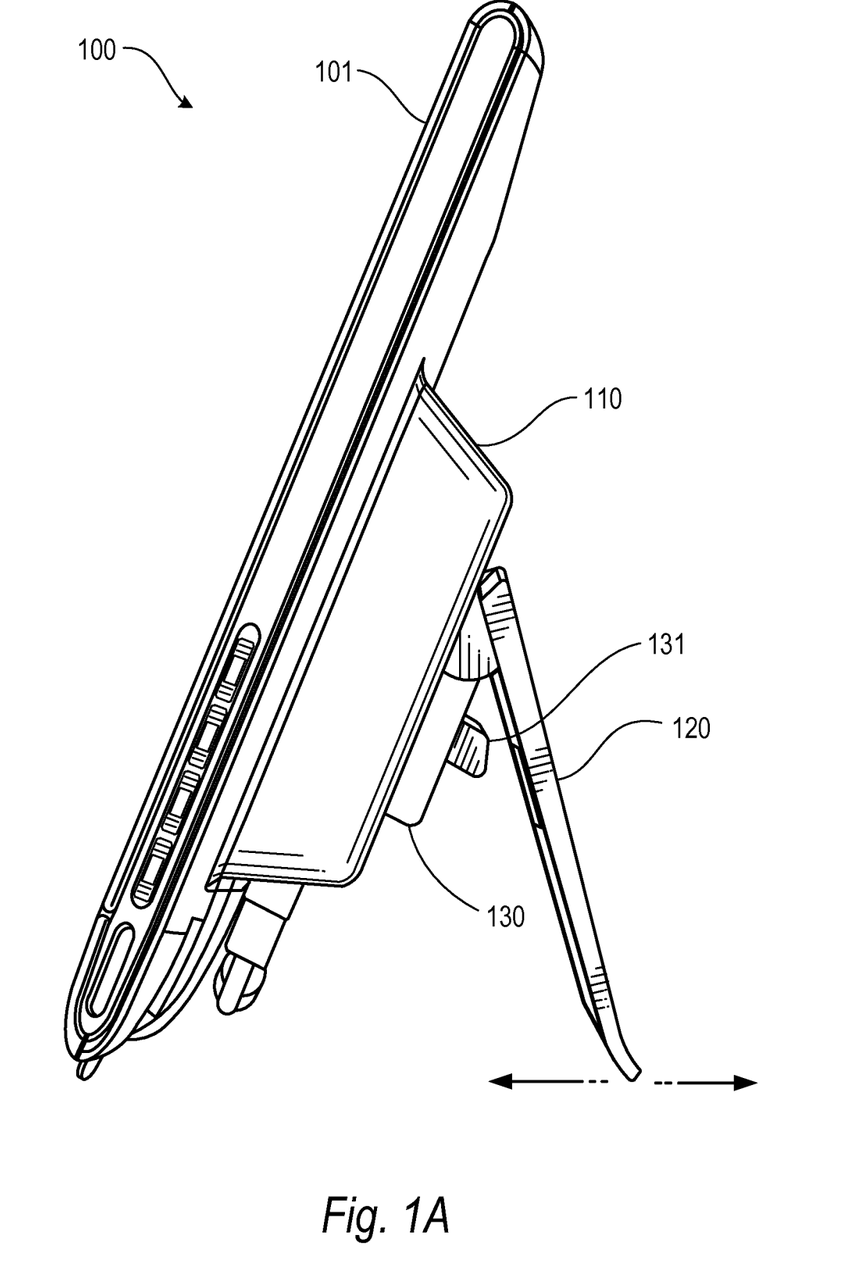
FIG. 1A is a side view of a flat-panel monitor showing the supporting stand mounted to the rear of the monitor in accordance with a representative embodiment of the present invention.

Reference will now be made in detail to a representative embodiment of the present invention shown in the accompanying drawings, wherein like reference numerals refer to the like elements throughout. Furthermore, in the following detailed description, numerous specific details are set forth in order to provide a thorough understanding of the present invention. However, it will be obvious to one of ordinary skill in the art that the present invention can be practiced without these specific details FIG. 1A is a side view of a flat-panel computer monitor 101 showing a supporting leg 120 mounted on the rear housing 110 of the flat-panel monitor. The display assembly enclosure 100 is preferably constructed of a hard durable molded thermoplastic, such as ABS (Acrylonitrile Butadiene Styrene) plastic or PC (polycarbonate) plastic. The rear housing 110 is a hard plastic shell that covers the electronics portion of monitor 101 and is also preferably integrally molded into the plastic monitor housing itself. A removable retainer clip 130, constructed of the same plastic material, is adapted to selectively engage openings in the rear housing 110 as is better shown in FIGS. 1B and 3. The function of retainer clip 130 is to provide a support structure that attaches supporting leg 120 to rear housing 110 in such a way to permit supporting leg 120 to pivot about an AXIS shown in FIG. 1B. In the side view as depicted in FIG. 1A, supporting leg 120 is in an extended position to provide the maximum tilt of the monitor relative to the supporting desktop surface.

Figure 1B:
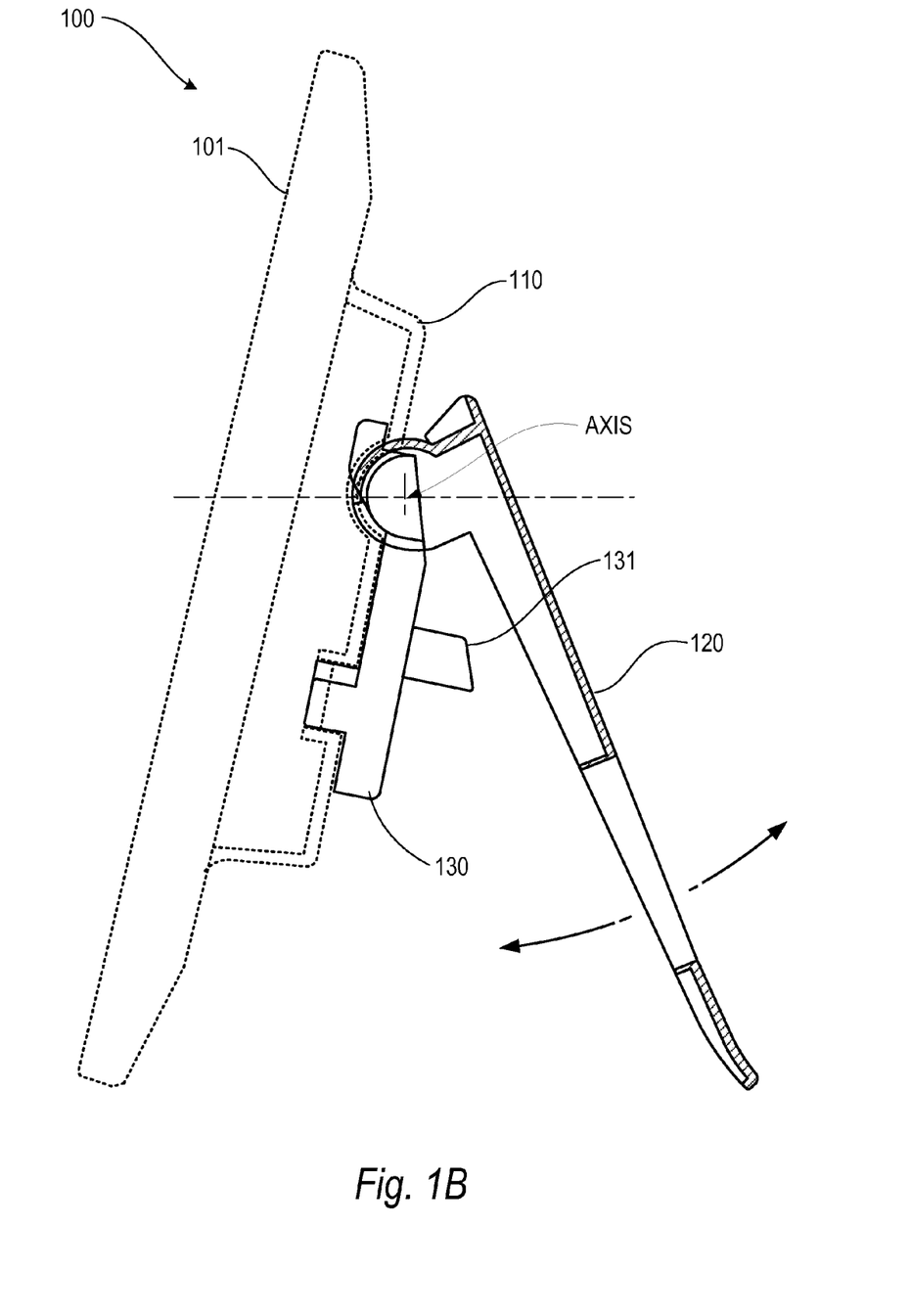
FIG. 1B is a cross-sectional view of the flat-panel monitor in FIG. 1A showing the support stand in greater detail as it mounts to the rear of the monitor in accordance with a representative embodiment of the present invention.

FIG. 1B shows a cross section of the supporting leg 120 and retainer clip 130. Since supporting leg 120 pivots at the junction with rear housing 110 about the AXIS shown in FIG. 1B, the bottom portion of the leg can be manually pivoted closer to the bottom of monitor 101 thereby reducing the vertical tilt of the monitor. Rotation stops 131a and 131b, shown better in FIG. 3, prevent supporting leg 120 from collapsing to the plane of the monitor, since that would cause the monitor either to be in a very unstable nearly vertical configuration or to collapse altogether. Alternatively the bottom portion of the leg can be manually pivoted farther from the bottom of monitor 101 thereby increasing the vertical tilt of the monitor. The range of tilt from a vertical posit (is typically from 10° to approximately 30°. And for storage purposes supporting leg 120 and retainer clip 130 can be removed from rear housing 110 by simply unclipping assembly snaps 135a and 135b (not shown in FIG. 1A or 1B) from rear housing 110. This is also advantageous for shipping the monitor and stand assembly 100.

Figure 2:
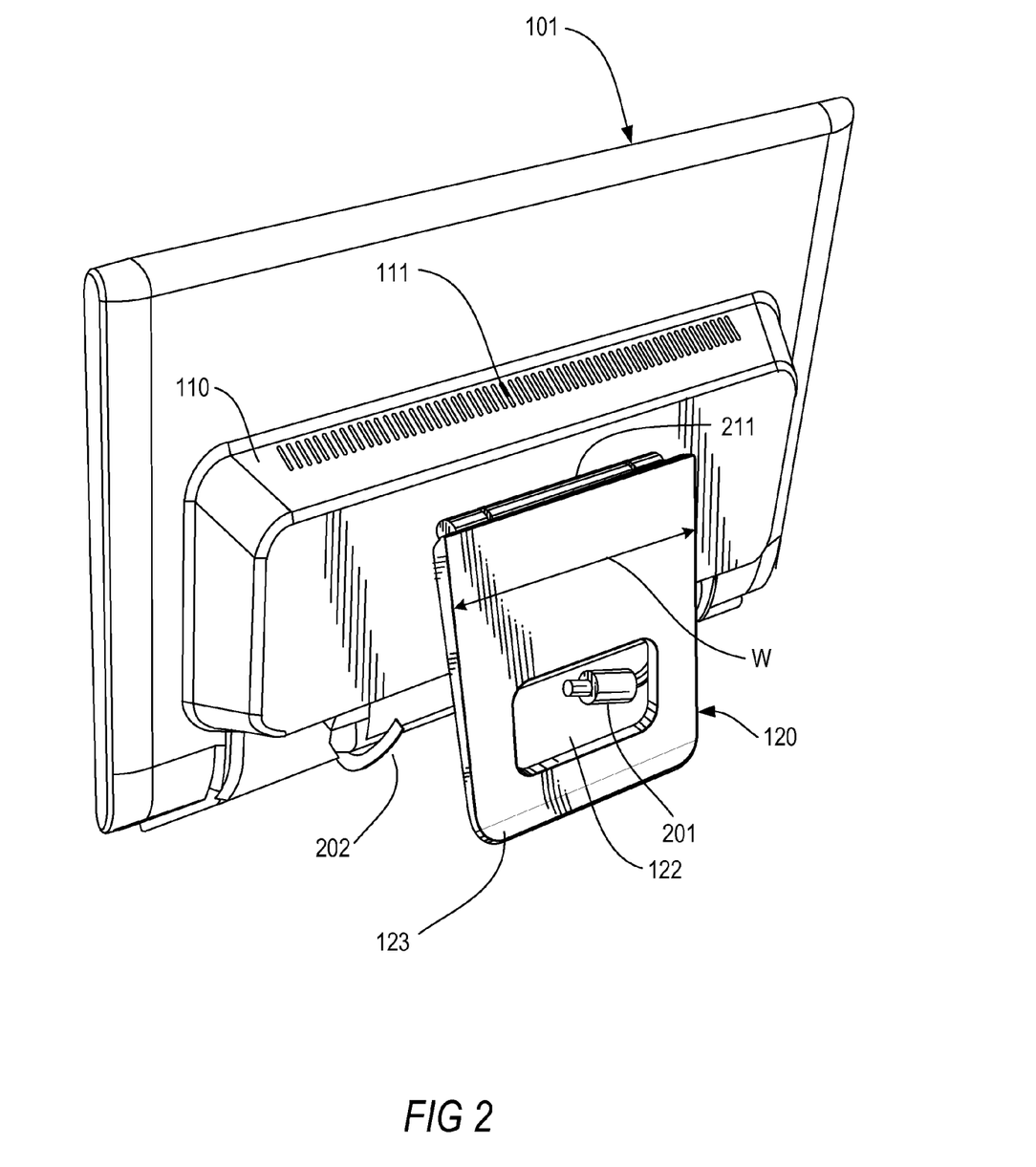
FIG. 2 is a rear perspective view illustrating the flat-panel monitor with the stand shown in an extended position.

Referring now to FIG. 2, the rear section of monitor 101 is shown with the stand assembly operationally connected to the rear housing 110. Air vents 111 are typically provided in rear housing 110 to allow air to circulate thereby dissipating heat generated from within the monitor. The electrical power and signal cables (partially depicted as cables 201 and 202 respectively) can either be channeled through opening 122 or dressed completely around supporting leg 120 depending on the placement of a computer (not shown) and the location of a power outlet. The top or upper end portion 211 (as shown in FIG. 2) of supporting leg 120 that makes pivoting contact with monitor housing 110 has a rotating pivot mechanism to permit the bottom 123 of supporting leg 120 to be manually moved closer to the monitor or farther away to optionally change the vertical tilt of monitor 101 as desired by the user. As an option the bottom portion 123 that makes contact with the desktop or table can be fitted with a rubberized coating to provide some sliding resistance of supporting leg 120 on a hard surface such as a desktop. This is to add greater stability to the entire display assembly 100. The width "W" of supporting leg 120 is depicted in FIG. 2 as approximately 30% of the width of the monitor. This is discretionary with the manufacturer, but less than 10% to 15% of the width of the monitor can potentially cause stability problems. Similarly the top portion 211 should be positioned to make contact with monitor housing 110 at least half-way up from the monitor base so that the center of gravity of the monitor is not above the connection (211) point with supporting leg 120 otherwise the monitor is apt to tip over backwards. (If the center of gravity of monitor 101 were below the midpoint of the monitor, then the connection point could be lowered accordingly without adding an instability to the overall structure.)

Figure 3:
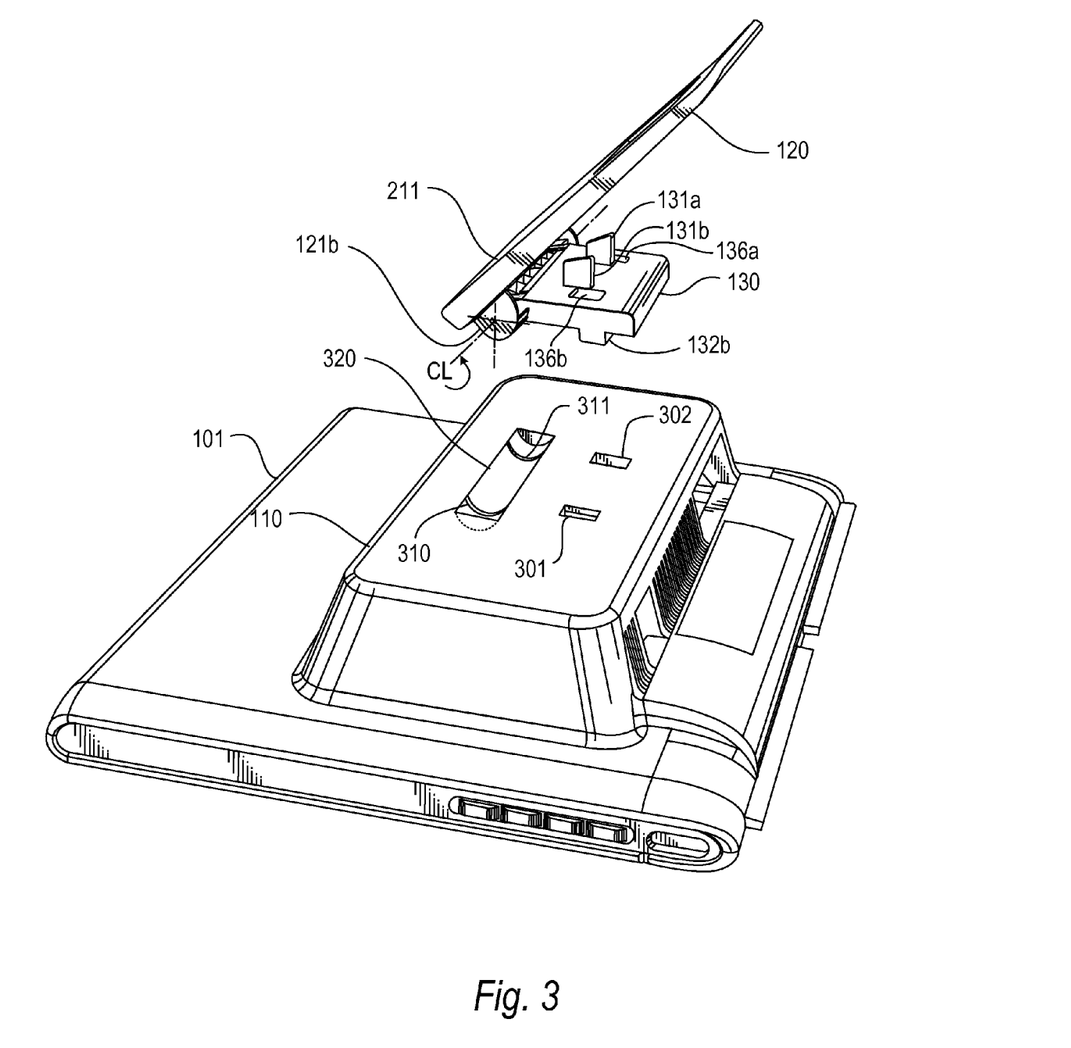
FIG. 3 is a partially exploded perspective view illustrating the rear of the flat-panel monitor 101 with the stand assembly shown detached from the monitor.
Figure 4A:
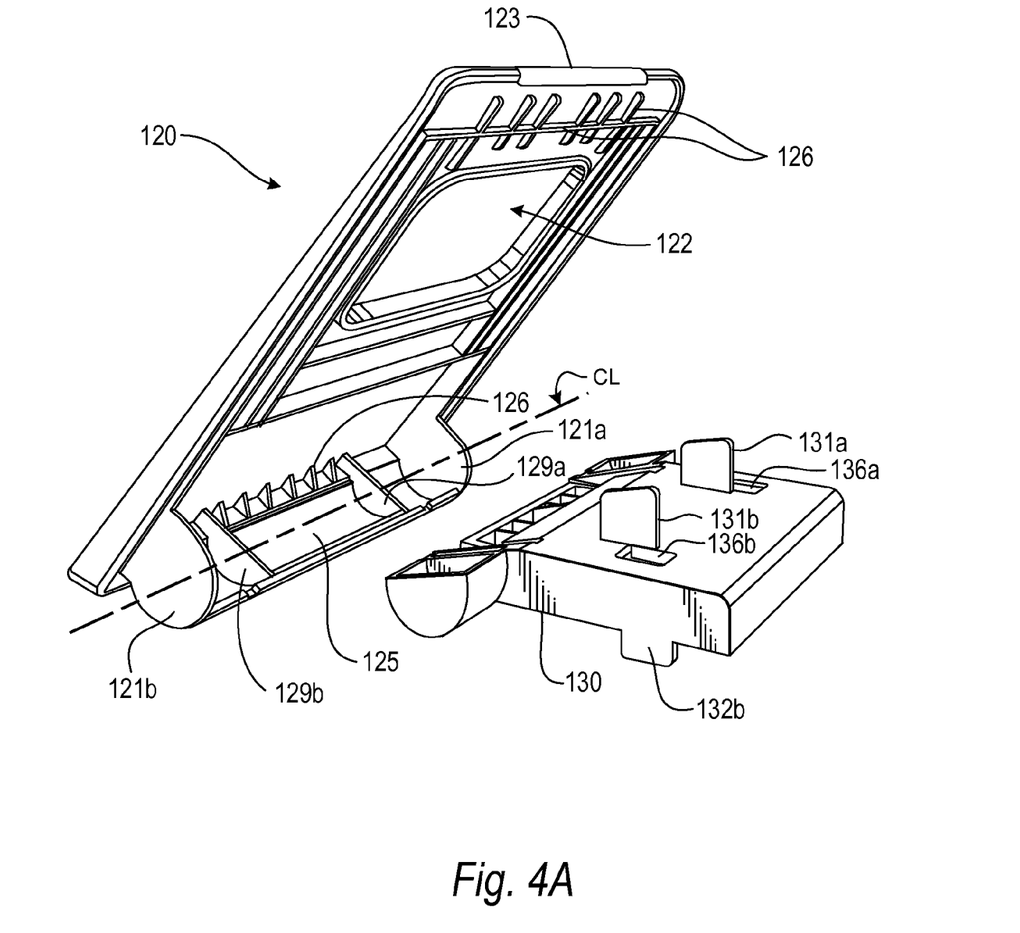
FIG. 4A is a side-perspective view illustrating the two major sections of the stand assembly shown disconnected from each other in accordance with a representative embodiment of the present invention.
Figure 4B:
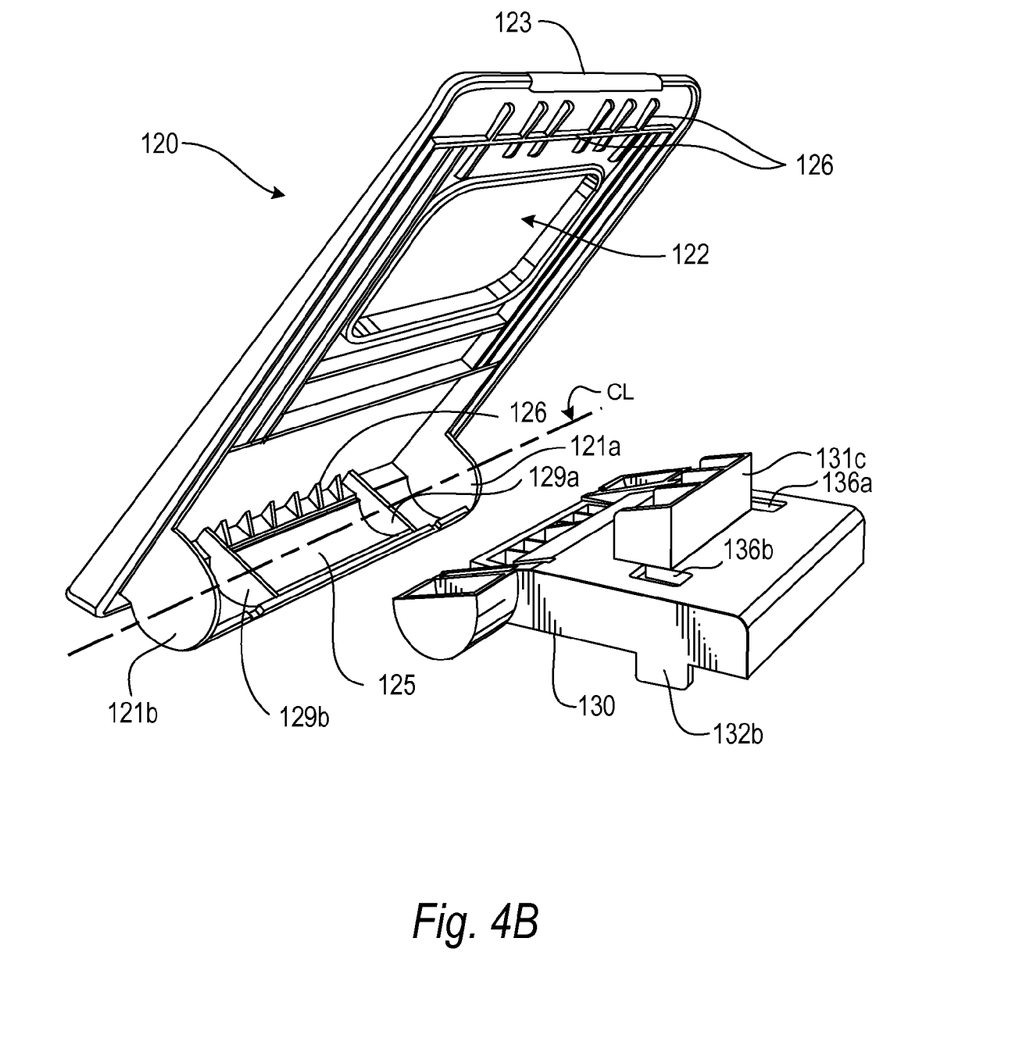
FIG. 4B is another side-perspective view illustrating the two major sections of the stand assembly shown disconnected from each other and depicting an alternate variation of retainer clip 130 in accordance with another representative embodiment of the present invention.
Figure 5:
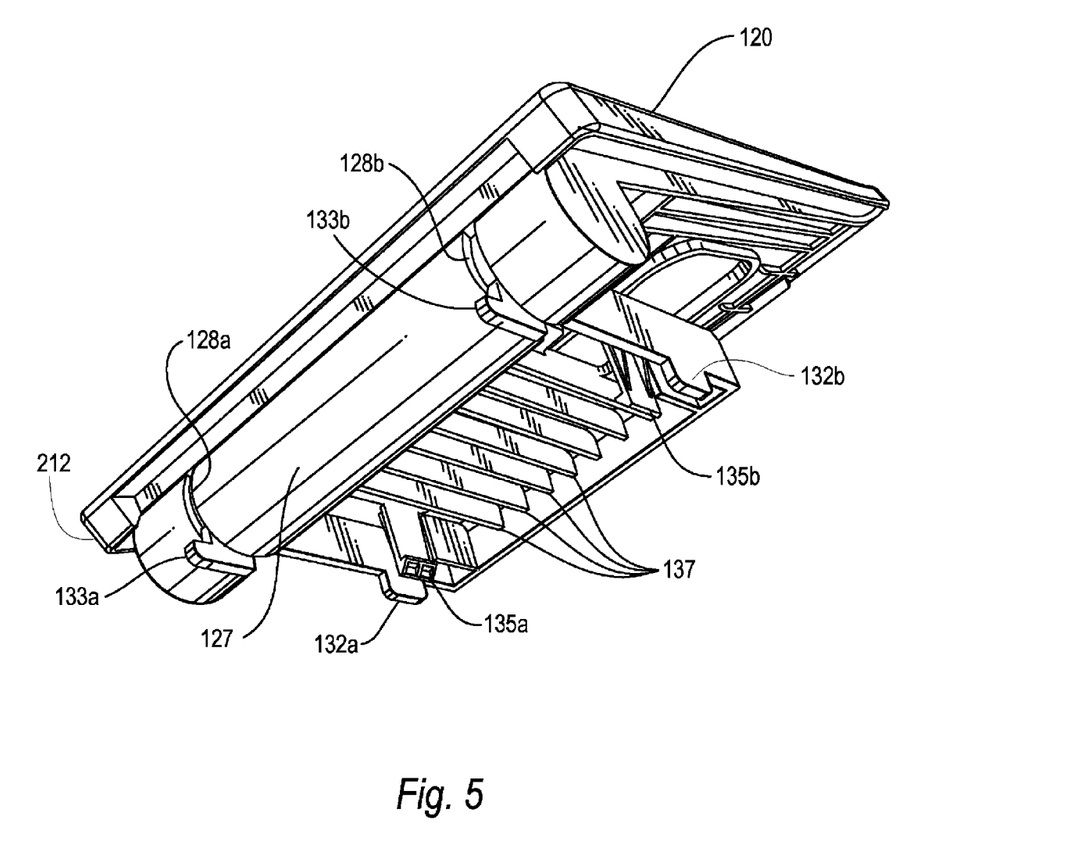
FIG. 5 is a bottom perspective view illustrating the two major sections of the stand assembly shown connected together to better illustrate how the retainer clip can attach to the rear monitor housing.
Figure 6:
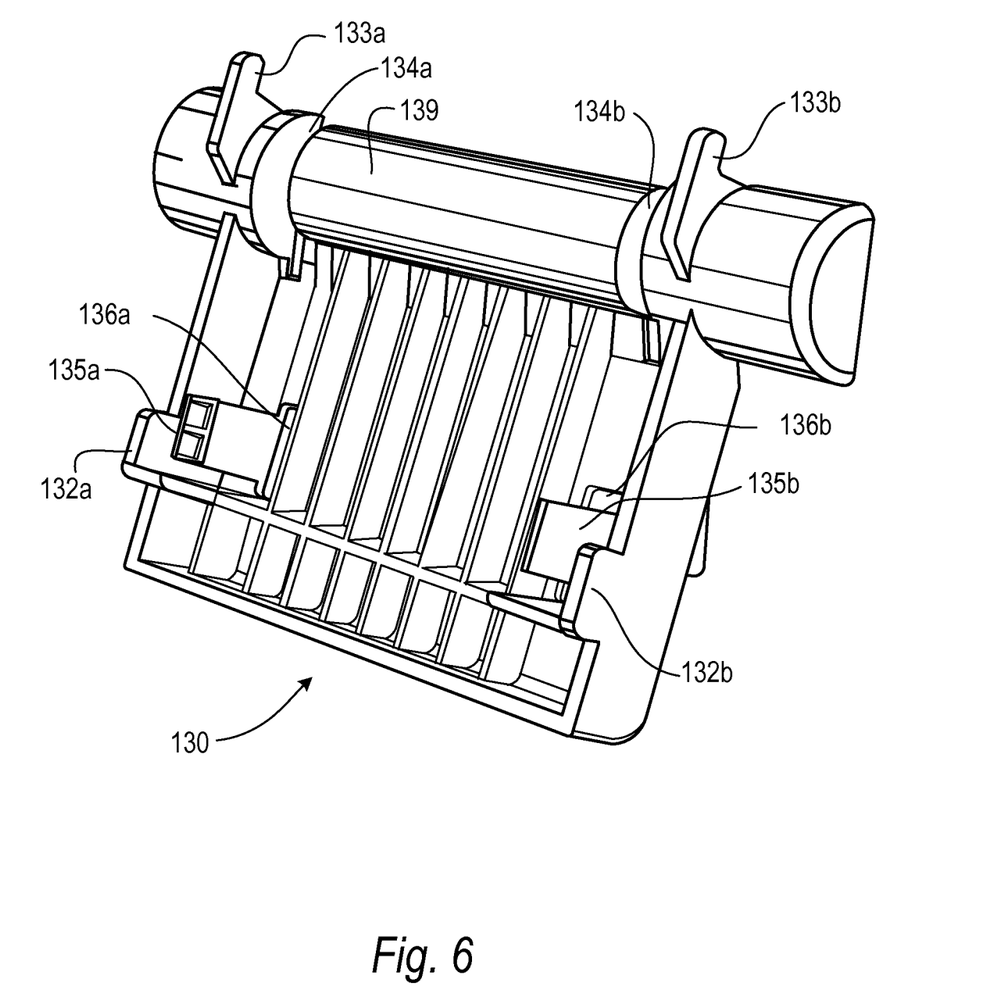
FIG. 6 is another bottom perspective view illustrating only the retainer clip 130 portion of the stand assembly in accordance with a representative embodiment of the present invention.
Figure 7:
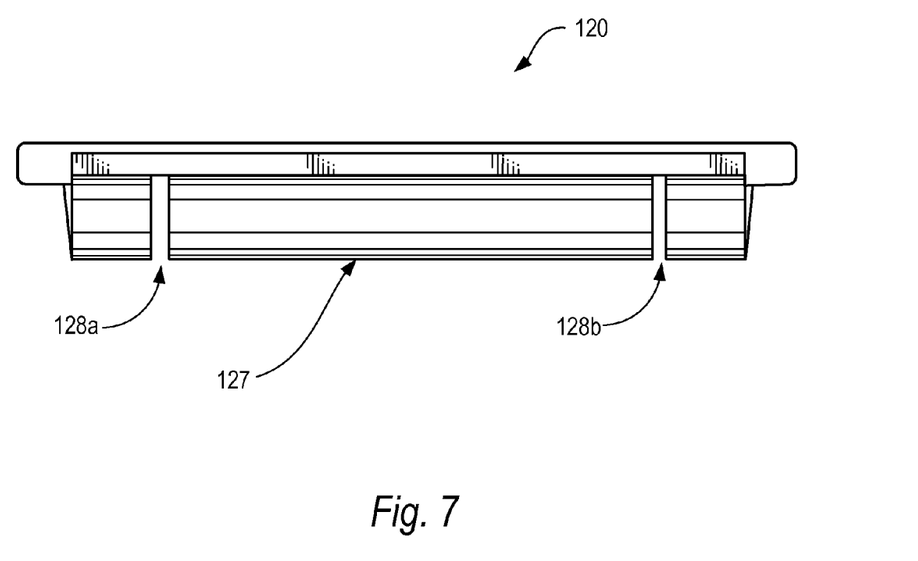
FIG. 7 is an end view of the supporting leg 120 illustrating the location of slots 128a and 128b in accordance with a representative embodiment of the present invention.

Referring now to FIGS. 3 and 4A, FIG. 3 shows a rear perspective view of flat-panel monitor 101 in a face down orientation, with supporting leg 120 and retainer clip 130 shown detached from monitor rear housing 110, FIGS. 4A and 4B show the same supporting leg 120 and retainer clip 130 but separated from each other and in a slightly different orientation to better illustrate details of both components. As is illustrated in these figures, the stand comprises two modular components: a retainer clip 130 and a supporting leg 120. Retainer clip 130 is adapted to selectively engage positioning slots 302 and 301 in rear housing 110 when locator tabs 132a and 132b, respectively, are inserted therein. (Both retainer tabs 132a and 132b are shown in FIGS. 5 and 6.) Supporting leg 120 has an integral elongated tubular section, defined by end plates 121a and 121b, designed to rotationally engage a similar mating tubular section in retainer clip 130. In the joined configuration the tubular sections form a type of hinge mechanism permitting supporting leg 120 to pivot about the center-line axis CL depicted in FIGS. 3, 4A, and 4B. And when the two components (120 and 130) are coupled together, the one end, 211, of the supporting leg engages rear housing 110 within a semicircular elongated receiving trough 320 molded a housing 110. Receiving trough 320 has a smooth bearing surface to permit contacting surface 127 of supporting leg 120 to slide within the shallow trough thus allowing supporting leg 120 to partially rotate back and forth about an axis CL. As is shown therein the elongated tubular section of supporting leg 120 extending from end plates 121a to 121b fits snugly within the shallow receiving trough 320. Similarly the tubular portion of retainer clip 130 fits snugly within the tubular section of supporting leg 120 to engage therein a friction surface. By pressing the tubular section of supporting leg 120 into trough 320, this allows the combination to function as a hinge mechanism permitting supporting leg 120 to partially rotate within the limits set by the apparatus. To increase the frictional forces on the inner surface 125 of the rotational well, a thin rectangular strip of a rubberize compound is affixed to the surface therein to add rotational resistance when supporting leg 120 is rotated back and forth within receiving through 320. A pair of support ribs 129a and 129b are adapted to glide into slots 128a and 128b of retainer clip 130 when the two parts are interconnected. (These two slots are seen in FIG. 6.) Support ribs 129a and 129b add torsional stability to supporting leg 120. The dimensions of supporting leg 120, retainer clip 130, and slots 301 and 302 are such that when frilly assembled retainer clip 130 is forced tightly into the rotational well 125 to insure that supporting leg 120 cannot freely rotated therein without some amount of appropriate force applied to supporting leg 120. And the depth of receiving trough 320 is sufficient to permit the base of the retainer clip 130 to sit flush on rear housing 110 while allowing partial rotation of supporting leg 120 within receiving trough 320. FIG. 4A and FIG. 4B also show a plurality of additional support ribs 126 at strategic locations to provide additional strength and rigidity to overall frame of supporting leg 120. The actual number and placement of these support ribs is a matter of design choice depending on the thickness of the molded plastic and other structural considerations.

Referring again to FIG. 3, the rear monitor housing 110 is adapted to receive retainer clip 130 via four openings in the housing (301, 302, 310, and 311). Openings 301 and 302 are positioned so that locator tabs 132b and 132a may be inserted into these openings, respectively, and slid against the outside walls of each opening. The inner walls of 301 and 302 accommodate two resilient elongated clips 135b and 135a, respectively, which are shown in FIGS. 5 and 6. When inserted into the two holes on rear housing 110 a small inward-facing lip on both of these clips (135b and 135a) grabs the inside of rear housing 110 for a secure holding relationship to hold the lower end of retainer clip 130 in place. (Since rear housing 110 is a thin shell, clips 135a and 135b hold onto the inside of the shell to keep retainer clip 130 held securely in place.) Due to their inherent flexibility both retainer clips can be manually pushed out as shown in FIG. 5 to unclip them from the housing allowing retainer clip 130 and supporting 120 to be removed when desired from rear housing 110.

Retainer clip 130 and supporting leg 120 are shown in FIG. 5 from the bottom perspective and apart from the monitor housing 110. Assembly tabs 133a and 133b, shown in both FIG. 5 and FIG. 6, are a molded part of retainer clip 130 and, when connected to supporting leg 120, extend outward through slots 128a and 128b the tubular portion of supporting leg 120. When inserted into receiving trough 320, the two assembly tabs 133a and 133b fit into slots 311 and 310, respectively, to engage the inside surface of rear housing 110 and hold the other end of retainer clip 130 securely in place on the housing.

From a functional standpoint supporting leg 120 travels from an almost vertical position until rotation stops 131a and 131b prevent the supporting leg 120 from collapsing to the upper plane of retainer clip 130. An alternate means of preventing supporting leg 120 from collapsing to the upper plane of retainer clip 130 is shown in FIG. 4B. An elongated plastic ridge 131c extending across a portion of top plane of retainer clip 130 performs the same stopping function as the two rotations stops 131a and 131b, but has the advantage of providing a little more rigidity to the frame of retainer clip 130. The other extreme travel position (the open position) of supporting leg 120 occurs when the leg is fully extended and the inclined face 212 of support leg 120 impacts the surface of rear housing 110 adjacent receiving trough 320. Once the inclined face 212 impacts the surface of rear housing 110, supporting leg 120 cannot rotate (counterclockwise as shown in FIG. 1B) any further. The inclined face 212 is shown more clearly in FIGS. 5 and 8. To increase the maxima amount of monitor tilt, one needs to reduce the depth of the trough 320 to increase the center-line AXIS above the back plane of housing 110.

Figure 8:
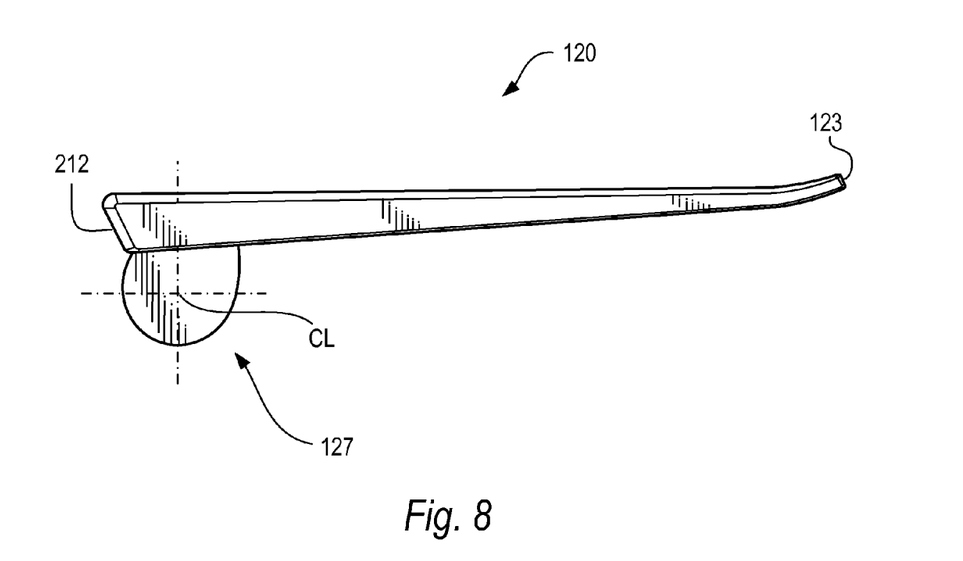
FIG. 8 is a side view of the supporting leg 120 illustrating the preferred contour of the supporting leg and the other design aspects of this part in accordance with a representative embodiment of the present invention.

FIG. 8 is a side view of supporting leg 120 which shows a design feature of supporting leg 120. In addition to being slightly tapered, the bottom end portion 123 has a slight bend to add more stability to the overall stand.

While aspects of the present invention have been described with reference to certain embodiments, it will be understood by those skilled in the art that various changes may be made and equivalents may be substituted without departing from the scope of the representative embodiments of the present invention. In addition, many modifications may be made to adapt a particular situation to the teachings of a representative embodiment of the present invention without departing from its scope. Therefore, it is intended that embodiments of the present invention not be limited to the particular embodiments disclosed herein, but that representative embodiments of the present invention include all embodiments falling within the scope of the appended claims.

What is claimed is:

1. A support device for supporting a flat-panel display on a horizontal surface, the support device comprising:
    an adjustable supporting leg for supporting the flat-panel display in an inclined position, the supporting leg having a substantially planar structure, with a top and bottom surface, and a first elongated semi-circular tubular member disposed at one end thereof, said tubular member being partially open along the longitudinal axis to form a semi-circular well; and
    a retainer clip housing disposed at the back of the flat-panel display and having a second elongated semi-circular tubular member disposed at one end of the retainer clip housing for rotatingly mating with the first elongated semi-circular tubular member of the supporting leg, said retainer clip adapted to removeably attach to the flat-panel display;
    wherein the first and second elongated tubular members when interconnected are disposed within a semi-circular rotational well molded into the flat-panel display to allow the supporting leg to partially rotate relative to the retainer clip.

2. A support device as in claim 1, wherein said support device further comprises:
    first and second positioning tabs affixed to the bottom surface of the retainer clip housing for positioning said retainer clip relative to the flat-panel display; and
    a pair of assembly hooks spaced apart and extending beyond the second elongated semi-circular tubular member, said assembly hooks adapted for locking one end of the retainer clip housing in place when secured to the flat-panel display.

3. A support device as in claim 2 wherein the retainer clip housing further comprises a pair of finger snaps disposed on the bottom surface of the retainer clip housing for securing the other end of the retainer clip housing to the flat-panel display.

4. A support device as in claim 3 wherein the retainer clip housing further comprises a pair of posts disposed on the top surface of the retainer clip housing to prevent the supporting leg from closing to the top surface of the retainer clip housing.

5. A support device as in claim 3 wherein the retainer clip housing further comprises an elongated ridge disposed on the top surface of the retainer clip housing to prevent the supporting leg from closing to the top surface of the retainer clip housing.

6. A support device as in claim 5 wherein the supporting leg and the retainer clip housing are each constructed of a hard molded plastic material.

7. A support device as in claim 6 wherein the supporting leg further comprises a substantially planar structure having an opening therein sufficient for channeling cables from the display apparatus.

8. A self-supporting flat panel display apparatus comprising:
    a flat panel display housing having a front and rear portion, and a recessed semi-circular tubular trough having a longitudinal axis, said recessed semi-circular tubular trough being disposed on the rear portion;
    a modular supporting stand pivotally secured to the recessed semi-circular tubular trough for supporting the display housing on a horizontal surface in an inclined position,
    said supporting stand comprising:
    an adjustable supporting leg having a substantially planar structure with a top and bottom surface, a first elongated semi-circular tubular member disposed on the bottom surface at one end of the supporting leg, the tubular member being partially open along the longitudinal axis forming a semi-circular well; and
    a retainer clip adapted for connection to the rear of the display housing and having a second elongated semi-circular tubular member disposed at one end thereof for rotatingly mating with the first elongated semi-circular tubular member of the supporting leg, said retainer clip adapted to be removeably coupled to the back of the display and for tightly holding the first elongated semi-circular tubular member within the recessed tubular trough in the flat panel display housing.

9. A flat panel display apparatus as in claim 8 wherein said flat panel display housing further comprises:

a first and second pair of positioning slots disposed on the rear portion of the display housing, said second pair of positioning slots being disposed within said recessed semi-circular tubular trough and transverse to said longitudinal axis.

10. A flat panel display apparatus as in claim 9 wherein said retainer clip further comprises:
   a pair of positioning tabs disposed on the retainer clip and adapted for insertion through the first pair of positioning slots, and
   a pair of elongated snaps disposed on the retainer clip and adapted to protrude through the first pair of positioning slots for securely holding the retainer clip to the rear of the display.

11. A flat panel display apparatus as in claim 10 wherein said first elongated semi-circular tubular member further comprises a pair of supporting ribs disposed transverse to the longitudinal axis thereof for providing torsional rigidity to said tubular member.

12. A flat panel display apparatus as in claim 11 wherein the retainer clip housing further comprises a pair of posts disposed on the top surface of the retainer clip housing to prevent the supporting leg from closing to the top surface of the retainer clip housing.

13. A flat panel display apparatus as in claim 11 wherein the retainer clip housing further comprises an elongated ridge disposed on the top surface of the retainer clip housing to prevent the supporting leg from closing to the top surface of the retainer clip housing.

14. A flat panel display apparatus as in claim 13 wherein the adjustable supporting leg and the retainer clip are constructed of a hard molded plastic material.

15. A flat panel display apparatus as in claim 8 wherein the adjustable supporting leg is rotatingly moveable about the recessed semi-circular tubular trough so as to allow said flat panel display to till backwards within a 20° range.

* * * * *